(12) United States Patent
Kawamura et al.

(10) Patent No.: US 6,219,098 B1
(45) Date of Patent: Apr. 17, 2001

(54) TV CAMERA LENS WITH FLANGE BACK LENGTH CONTROLLER

(75) Inventors: Hiroyuki Kawamura; Hiroshi Mizumura, both of Omiya (JP)

(73) Assignee: Fuji Photo Optical Co., Ltd., Omiya (JP)

( * ) Notice: Subject to any disclaimer, the term of this patent is extended or adjusted under 35 U.S.C. 154(b) by 0 days.

(21) Appl. No.: 08/934,667

(22) Filed: Sep. 22, 1997

(30) Foreign Application Priority Data

Sep. 24, 1996 (JP) .................................................. 8-251984

(51) Int. Cl.⁷ ..................................................... H04N 5/225
(52) U.S. Cl. .......................................... 348/335; 348/358
(58) Field of Search ................................. 396/72, 73, 76, 396/77, 79, 80, 82; 348/335, 343, 344, 345, 347, 358, 207; G03B 17/00; H04N 5/225

(56) References Cited

U.S. PATENT DOCUMENTS 5,523,784 * 6/1996 Nagano ................................. 348/207
5,771,410 * 6/1998 Sato et al. ............................... 396/79

FOREIGN PATENT DOCUMENTS 58-1401    1/1983  (JP) .
60-46405  10/1985  (JP) .

* cited by examiner

*Primary Examiner*—Tuan Ho
(74) *Attorney, Agent, or Firm*—Nixon Peabody LLP; David S. Safran

(57) ABSTRACT

There are provided a position control signal generating means and a rate control signal generating means for driving a master lens group. One of these two means is validated by means of a changeover switch. A macro-shooting controller including the rate control signal generating means also serves as a zoom controller. After the position control signal generating means is validated to adjust a flange back length, the rate control signal generating means is validated, and then the master lens group moves to a macro-shooting position, etc. Thereafter, if the position control signal generating means is validated again by means of the changeover switch, the master lens group automatically returns to the previously-adjusted position of the proper flange back length.

8 Claims, 6 Drawing Sheets

TV CAMERA LENS WITH FLANGE BACK LENGTH CONTROLLER

BACKGROUND OF THE INVENTION

1. Field of the Invention

The present invention relates generally to a TV camera lens, and more particularly to a drive controlling technique of a TV camera lens, in which a master lens group moves forward and backward along the optical axis to adjust the flange back length and set the optical system for the macro-shooting.

2. Description of Related Art

In a zoom lens applied in a broadcast TV camera, a master lens group of a taking lens system is moved forward and backward along the optical axis to adjust the flange back length, thereby forming a sharp image of an object on a picture screen. Japanese Patent Publication Nos. 58-1401 and 60-46405 disclose TV camera lenses in which the master lens group is moved forward and backward along the optical axis to set the optical system for the macro-shooting.

That is, a rotary adjustment knob is usually provided at one side of the mount frame (the right side viewed from the front, i.e. the left side of a user) so that rotational force of the adjustment knob can be transmitted to a master lens driving mechanism in a lens mount via a power transmission mechanism such as an assembly of gears. If the user turns the adjustment knob by hand, an image formation position of the TV camera lens can be fine adjusted and the macro-shooting can be performed.

In the TV camera lens in which the master lens group is moved to perform both the flange back length adjustment and the macro-shooting, however, since the normal shooting is usually performed after the flange back length adjustment is completed, and the macro-shooting is performed as the need arises during the normal shooting, it is difficult to correctly return the master lens group to the initially-adjusted position of the proper flange back length when the shooting is switched from the macro-shooting to the normal shooting.

In a well-established technique, the master lens group is moved for the purpose of achieving special effects such as obscuring a shot image. In the conventional TV camera lens, however, since the master lens group is moved with the rotation of the adjustment knob provided at the side of the casing and the rotational force is mechanically transmitted via the assembly of gears or the like, it is difficult to smoothly move the master lens group and naturally obscure the shot image.

SUMMARY OF THE INVENTION

The present invention has been developed in view of the above-described circumstances, and has as its object the provision of a TV camera lens which is able to correctly and repeatedly return a master lens group to a position of a proper flange back length after the macro-shooting and smoothly move the master lens group to naturally obscure the shot image.

To achieve the above-stated object, a TV camera lens according to the present invention which moves a master lens group, arranged in a lens mount of a lens body, forward and backward along the optical axis in accordance with operation of either one of the first and second external operating members, so as to adjust the flange back length and set the optical system for the macro-shooting, comprises: a flange back length controller for outputting the first electric signal instructing the master lens group to move in accordance with an operating amount of the first external operating member for adjusting the flange back length; a macro-shooting controller for outputting the second electric signal instructing the master lens group to move in accordance with an operating amount of the second external operating member for setting of the macro-shooting; a switching means for validating one of the flange back length controller and the macro-shooting controller; a driving means for driving the master lens group; and a control means for outputting a drive signal to the driving means to drive the master lens group in accordance with the one of the first and second electric signals output from the one of the flange back length controller and the macro-shooting controller which is validated by the switching means.

According to the present invention, in order to adjust the flange back length by moving the master lens group, the switching means validates the flange back length controller, and the first external operating member of the flange back length controller is operated to move the master lens group to the position of the proper flange back length. Thereafter, during the macro-shooting or the shooting aiming to achieve special effects, the switching means validates the macro-shooting controller, and the second external operating member of the macro-shooting controller is operated to move the master lens group to the macro-shooting position or any other desired positions. In this case, the flange back length controller retains the instruction which was given to set the master lens group at the position of the proper flange back length. Thus, after the macro-shooting or the shooting aiming to achieve special effects is complete and the flange back length controller is validated again by means of the switching means, the flange back length controller outputs the instruction to move the master lens group to the previously-adjusted position of the proper flange back length, and the master lens group can return to the position of the proper flange back length.

Thus, the user can easily adjust the flange back length and perform the macro-shooting. After the macro-shooting, the master lens group can be correctly and repeatedly returned to the position of the proper flange back length, which was once adjusted. The macro-shooting controller moves the master lens group after the flange back length adjustment, so that the master lens group can smoothly move along the optical axis. It is advantageous for a special technique of naturally obscuring an image during the shooting.

Moreover, because the zoom operation of the TV camera lens is usually rate-controlled, the zoom controller as a control means for the zoom operation serves as the macro-shooting controller. There is provided the second switching means (a zoom/macro switching means) which determines whether the controller should be used as the zoom controller or as the macro-shooting controller. For this reason, no additional controller is required, and the operation can be easily performed with the existing external operating member.

Further, since the operating amount of the first and second external operating members is electrically converted into electric signals driving the master lens group, the ratio of the moving amount of the master lens group to the operating amount of the operating member can be electrically adjusted. Thus, if the sensitivity adjustment means changes the ratio of the moving amount to the operating amount, one external operating member can roughly and finely adjust the position of the master lens group.

Furthermore, the relationship between the operating direction of the operating member and the moving direction of the master lens group can be easily changed according to the electric connection. Since there is provided the reverse means, which reverses the moving direction of the master lens group with respect to the operating direction of the operating member, the directional relationship can be determined as the user's choice.

BRIEF DESCRIPTION OF THE DRAWINGS

The nature of this invention, as well as other objects and advantages thereof, will be explained in the following with reference to the accompanying drawings, in which like reference characters designate the same or similar parts throughout the figures and wherein.

DETAILED DESCRIPTION OF THE PREFERRED EMBODIMENTS

This invention will be described in further detail by way of example with reference to the accompanying drawings.

Figure 1:
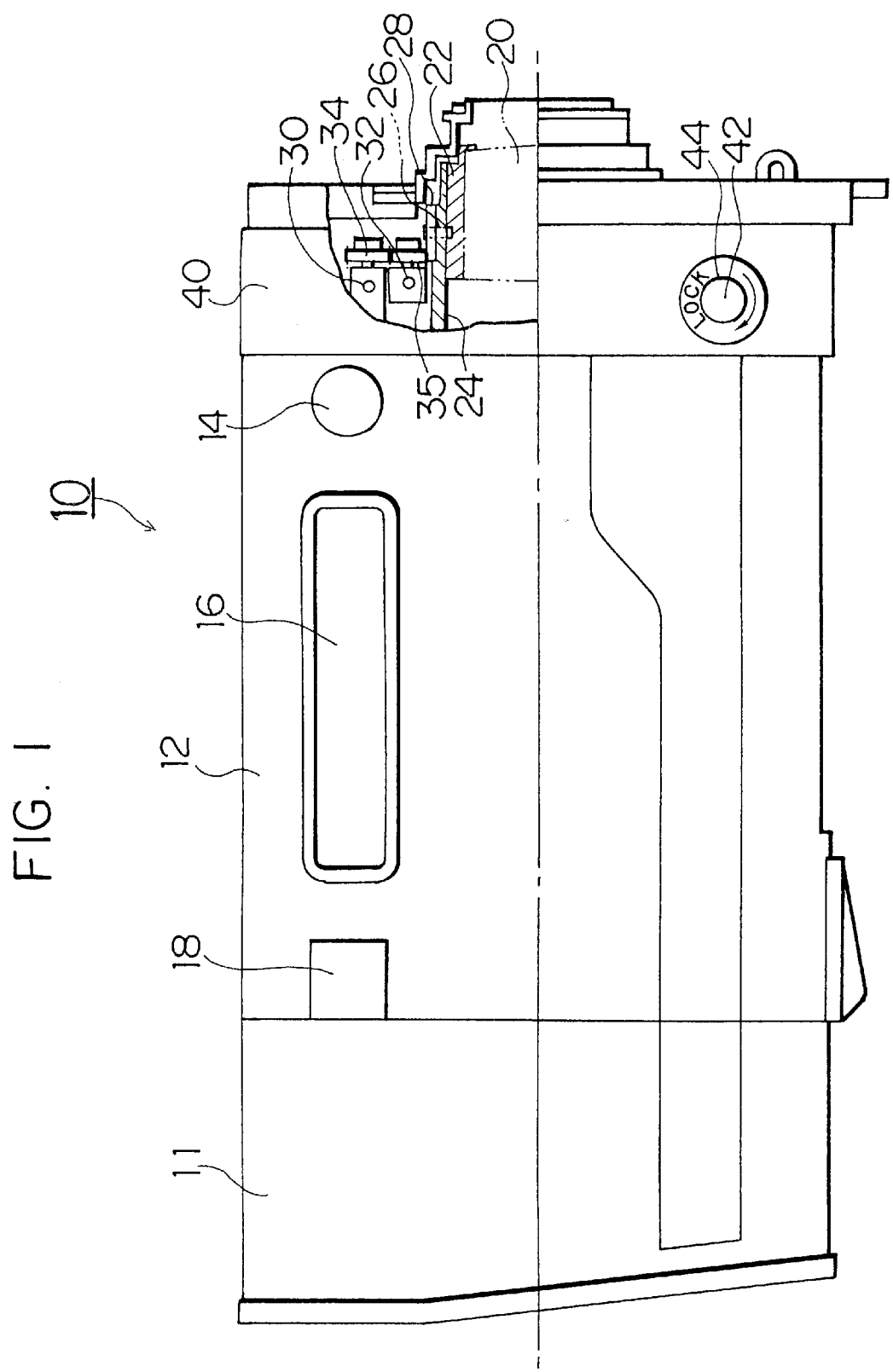
FIG. 1 is a side view of a TV camera lens according to the present invention.

FIG. 1 is a side view of a TV camera lens according to the present invention, and it partially illustrates the inner structure of the TV camera lens. The front part of a lens body 10 is covered with a hood 11 at the left of the drawing. A TV camera is connected and fixed to the lens body 10 on a right end face in the drawing. The lens body 10 is covered with a substantially rectangular-parallelepiped cover 12, which is detachably fixed to the lens body 10 via screws 14 provided at the right and left sides of the TV camera lens. A concave 16 is formed at the center of the upper part of the side of the cover 12, and the concave 16 is grasped when the TV camera lens is carried. There is a tally lamp window 18 in front of the concave 16.

Although the inner structure of the lens body 10 is not illustrated in detail, there are provided a fixed focus lens group, a movable focus lens group, a first movable zoom lens group, a second movable zoom lens group, a master lens group 20, and the like on a lens mount of the lens body 10.

A master lens mount 22 holds the master lens group 20, and the master lens group 20 is connected to the end of a fixed lens mount 24 in such a manner as to be movable in forward and backward directions. A guide hole is formed on a peripheral face of the fixed lens mount 24, and the guide hole is parallel to the optical axis. A pin 26 is attached to the master lens mount 22, and the pin 26 is inserted into the guide hole. A cam cylinder 28 is rotatably attached to the outer peripheral face of the fixed lens mount 24, and a cam groove having a predetermined width is formed on the cam cylinder 28 diagonally with respect to the optical axis. The pin 26 of the master lens mount 22 engages with the cam groove.

The lens body 10 is also provided with a drive motor 30 for driving the master lens group 20, and a potentiometer 32 for determining the position of the master lens group 20. A driving force of the motor 30 is transmitted to the cam cylinder 28 via gears 34, 35. When the cam cylinder 28 rotates, the master lens mount 22 moves forward and backward with respect to the fixed lens mount 24. According to the rotating amount of the cam cylinder 28, the potentiometer 32 outputs a position determination signal representing the determined position of the master lens group 20.

A flange back length control 42 for adjusting a flange back length of the TV camera lens is provided at the lower part of the side of a mount frame 40. The flange back length control 42 is provided with a potentiometer (not shown) which outputs a position control signal according to the turning amount of the flange back length control 42. The output position control signal is input to a control circuit 52 (shown in FIG. 2), and the control circuit 52 outputs a servo signal to drive the motor 30 according to the position control signal. When the motor 30 rotates, the rotational force is transmitted to the potentiometer 32 and the cam cylinder 28 via the gears 34, 35, so that the master lens mount 22 can move forward and backward along the optical axis.

Thus, by turning the flange back length control 42, the master lens group 20 can move forward and backward along the optical axis, and thereby an image-formation position of the TV camera lens can be adjusted on a picture screen of the TV camera. That is, the flange back length of the TV camera lens can be adjusted. Moreover, the master lens group 20 can be set at a proper position for the macro-shooting.

A fixing knob 44 is provided coaxially with the flange back length control 42. The fixing knob 44 locks the flange back length control 42 so as to prevent the flange back length adjusted with the flange back length control 42 from changing. That is, after the flange back length control 42 is turned to adjust the position of the master lens group 20, the fixing knob 44 is turned clockwise to fix the rotational axis of the flange back length control 42, thereby preventing the previously-adjusted position of the master lens group 20 from shifting due to unexpected external force.

Next, an explanation will be given about a drive control system of the master lens group 20.

Figure 2:
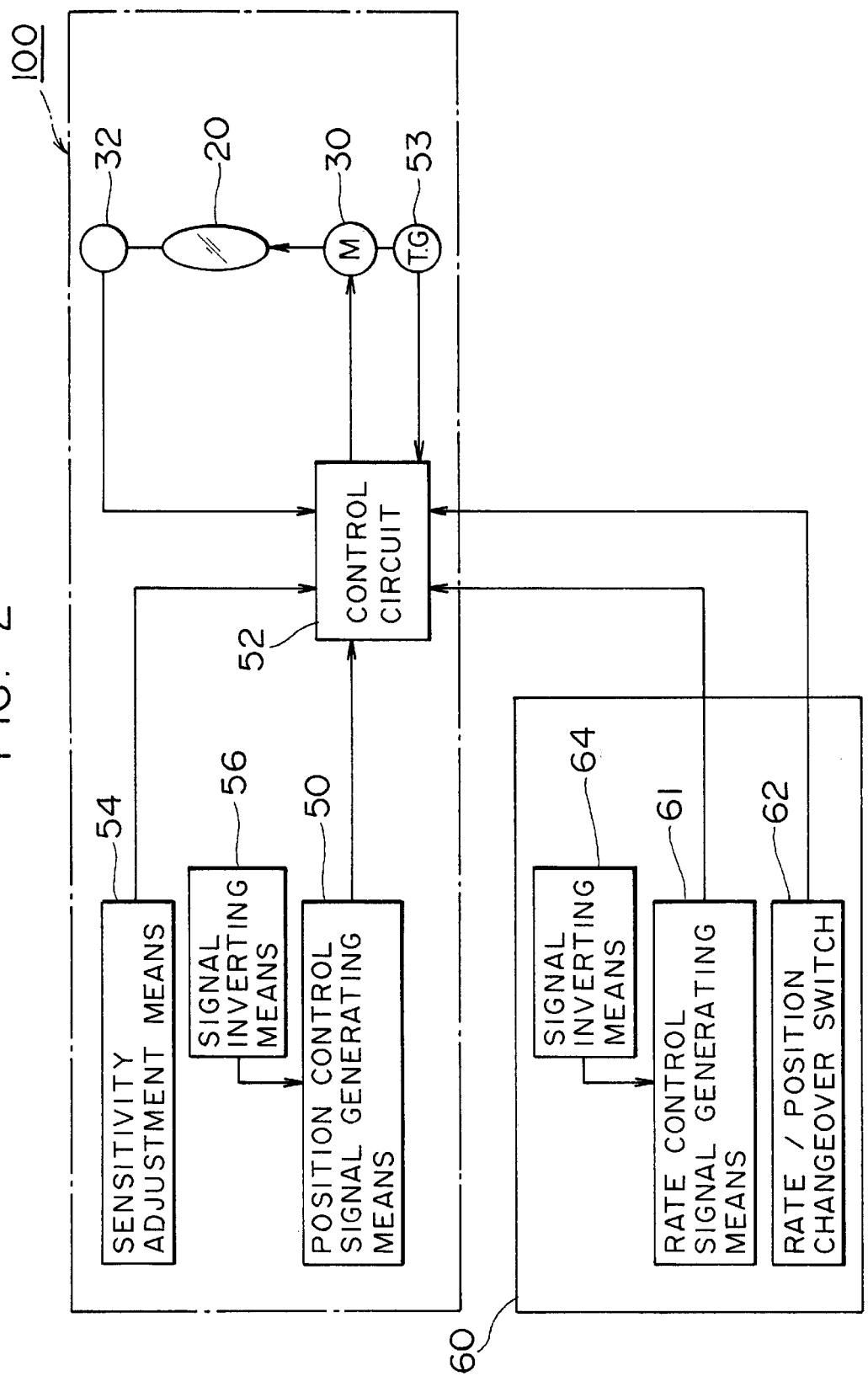
FIG. 2 is a block diagram illustrating the construction of a drive control system for a master lens group.

FIG. 2 is a block diagram illustrating the construction of the drive control system of the master lens group 20. A position control signal generating means 50 is equivalent to the flange back length control 42 in FIG. 1 and the potentiometer provided at the flange back length control 42. When the flange back length control 42 is turned, the position control signal generating means 50 outputs an electric signal representing a position to which the master lens group 20 moves, according to the turning amount of the flange back length control 42. The output electric signal is input to the control circuit 52.

The control circuit 52 outputs a servo signal according to the input electric signal so as to drive the motor 30. When the motor 30 rotates, the cam cylinder 28 rotates as stated previously, and the master lens group 20 moves forward and backward along the optical axis. The potentiometer 32 determines the position of the master lens group 20, and transmits the position determination signal representing the determined position of the master lens group 20 to the control circuit 52. When the position determined by the potentiometer 32 corresponds to the position indicated by the position control signal generating means 50, the control circuit 52 stops driving the motor 30. Thereby, the position control can be accurate.

A tachogenerator 53, which determines the number of rotations of the motor 30, is connected to the motor 30. The tachogenerator 53 transmits a signal representing the determined number of rotations to the control circuit 52, and the signal is used to rate-control the motor 30.

A sensitivity adjustment means 54 is connected to the control circuit 52 in such a way that the ratio of the moving amount of the master lens group 20 to the turning amount of the flange back length control 42 can be adjustable. For example, the sensitivity adjustment means 54 is provided with a rotary switch, a dip switch, or the like so that resistances connected to the circuit can be switched according to the setting of the switch. According to the connected resistance, the ratio of the moving amount of the master lens group 20 to the turning amount of the flange back length control 42 can be gradually set as follows: 1:1, 1:2, 1:3, . . . , and/or 1:1, 1:1/2, 1:1/3, . . . Thus, the position of the master lens group 20 can be roughly or finely adjusted.

A signal reverse means 56 is connected to the position control signal generating means 50 in such a way that the moving direction of the master lens group 20 can be reversed with respect to the turning direction of the flange back length control 42. Since the turning amount of the flange back length control 42 is converted into the electric signal to drive the master lens group 20, the relationship between the turning direction of the flange back length control 42 and the moving direction of the master lens group 20 is determined according to the electric connection and whether the electric signal is positive or negative. Thus, the moving direction of the master lens group 20 can be reversed with respect to the turning direction of the flange back length control 42 by changing the electric connection or the sign of the electric signal. Thereby, the relationship between the turning direction of the flange back length control 42 and the moving direction of the master lens group 20 can be determined as the user's choice.

A macro-shooting controller 60 is connected to the TV camera lens 100. The macro-shooting controller 60 is provided with a rate control signal generating means 61, which generates a rate control signal, and a rate/position changeover switch 62 for validating one of the rate control signal generating means 61 and the position control signal generating means 50.

If the rate/position changeover switch 62 is set to the "rate" side, that is, the macro-shooting controller side, a signal indicating to that effect is transmitted to the control circuit 52 of the TV camera lens 100. Then, the rate control signal generating means 61 is validated, whereas the position control signal generating means 50 is invalidated. That is, the control circuit 52 disregards the position control signal from the position control signal generating means 50, and outputs the servo signal to the motor 30 according to the rate control signal from the rate control signal generating means 61.

On the other hand, if the rate/position changeover switch 62 is set to the "position" side, that is, the flange back length controller side, a signal indicating to that effect is transmitted to the control circuit 52 of the TV camera lens 100. Then, the position control signal generating means 50 is validated, whereas the rate control signal generating means 61 is invalidated. That is, the control circuit 52 disregards the rate control signal from the rate control signal generating means 61, and outputs the servo signal to the motor 30 according to the position control signal from the position control signal generating means 50.

A signal reverse means 64 is connected to the rate control signal generating means 61 in such a way that the moving direction of the master lens group 20 can be reversed with respect to the operating direction of an operating member (not shown). Although not illustrated, there may be provided a sensitivity adjustment means, which is similar to the sensitivity adjustment means 54 and adjusts the ratio of the moving amount of the master lens group 20 to the operating amount of the operating member, or the sensitivity adjustment means 54 may have the functions of the sensitivity adjustment means of the macro-shooting controller 60.

An explanation will hereunder be given about the operation of the TV camera lens which is constructed in the above-mentioned manner.

First, the rate/position changeover switch 62 in FIG. 2 is set to the flange back length controller side so as to validate the position control signal generating means 50. Then, the master lens group 20 is set to the proper focusing position (the position of the proper flange back length) by turning the flange back length control 42 while the image-formation condition is observed through a view finder 122 of a TV camera 120 in FIG. 3. When the flange back length adjustment is completed, the fixing knob 44 is turned to fix the rotational axis of the flange back length control 42 so as to prevent the previously-adjusted position of the master lens group 20 from shifting due to unexpected external force, etc.

Figure 3:
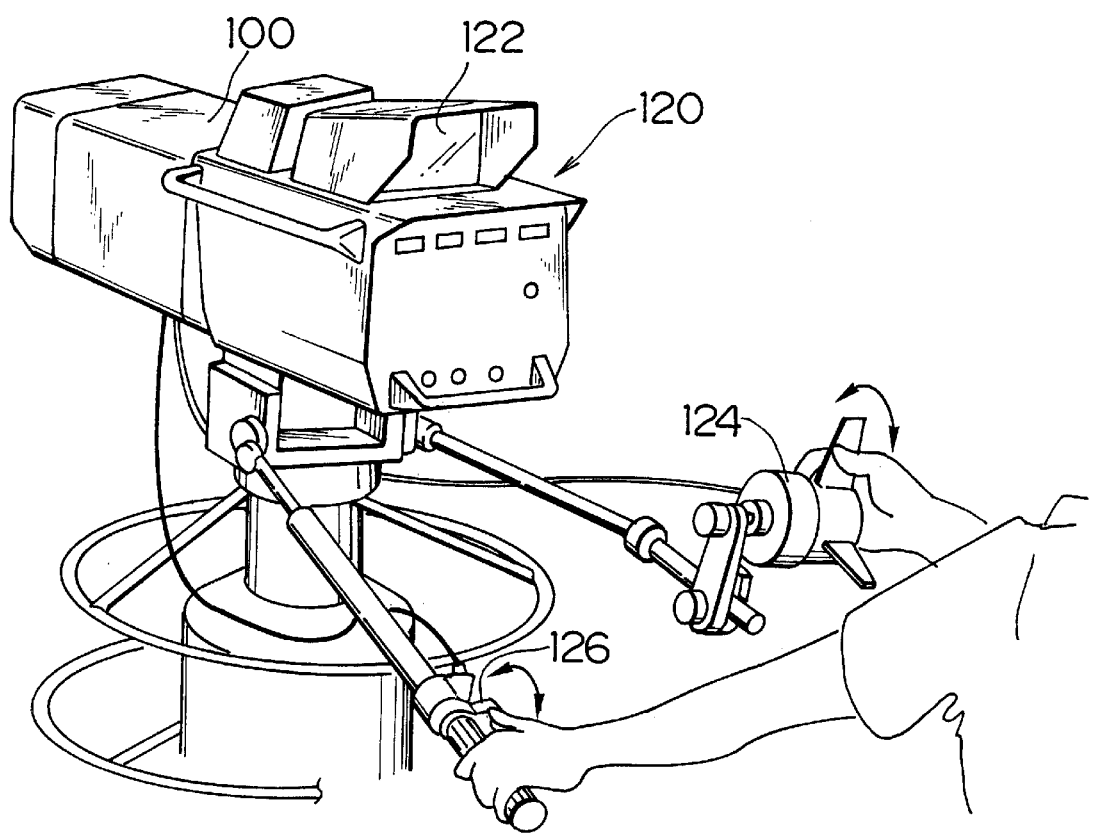
FIG. 3 is a perspective view describing the operation of the TV camera lens.

Thereafter, in the normal shooting, the focusing is adjusted by manipulating a focus demand (a focus ring) 124 by the right hand as shown in FIG. 3 to move the focus lens (the movable focus lens group). The variable magnification is adjusted by manipulating a zoom demand (a zoom ring) 126 by the left hand to move the zoom lens group (the first and second movable zoom lens groups) in a proper optical positional relationship. A focus controller including the focus ring 124 outputs a position control signal to drive the focus lens. On the other hand, a zoom controller including the zoom ring 126 outputs a rate control signal, and the zoom lens group is rate-controlled and driven according to the rate control signal.

In the macro-shooting, the rate/position changeover switch 62 in FIG. 2 is set to the macro-shooting controller side to validate the rate control signal generating means 61. At that time, although the signal from the position control signal generating means 50 is disregarded, the position controlling status of the position control signal generating means 50 is maintained where the previously-adjusted position of the master lens group 20 of the proper flange back length is represented. Then, an operating member (e.g. a rotary knob) of the macro-shooting controller 60 is operated in order to rate-control the master lens group 20, so that the master lens group 20 is moved to a macro-shooting position. Thus, the master lens group 20 can be set at the macro-shooting position. In the macro-shooting, the zoom ring 126 in FIG. 3 is operated in order to move the zoom lens group, so that the focusing can be adjusted.

In the normal shooting other than the macro-shooting, moving the master lens group 20 achieves such a special effect that an image is gradually obscured. For this reason, the master lens group 20 may be moved for purpose of achieving that special effect. If the above-mentioned technique is used, the rate/position changeover switch 62 is set to the macro-shooting controller side to validate the rate control signal generating means 61. Then, the operating member of the macro-shooting controller 60 is operated to move the master lens group 20. Thereby, the master lens group 20, which is rate-controlled by the macro-shooting controller 60, moves smoothly along the optical axis, and the image is naturally obscured. The operation for achieving such a special effect can also be easily performed.

After the macro-shooting or the operation for achieving the above-mentioned special effects, setting the rate/position changeover switch 62 again to the flange back length controller side validates the position control signal generating means 50, and the master lens group 20 automatically returns to the previously-adjusted position of the proper flange back length.

As stated above, once the flange back length is adjusted, the position control signal generating means 50 maintains the position controlling status where the previously-adjusted position of the master lens group 20 is represented, even if the master lens group 20 is driven by means of the macro-shooting controller 60. Thus, the master lens group 20 can be automatically and repeatedly returned to the position of the proper flange back length without fail.

Figure 4:
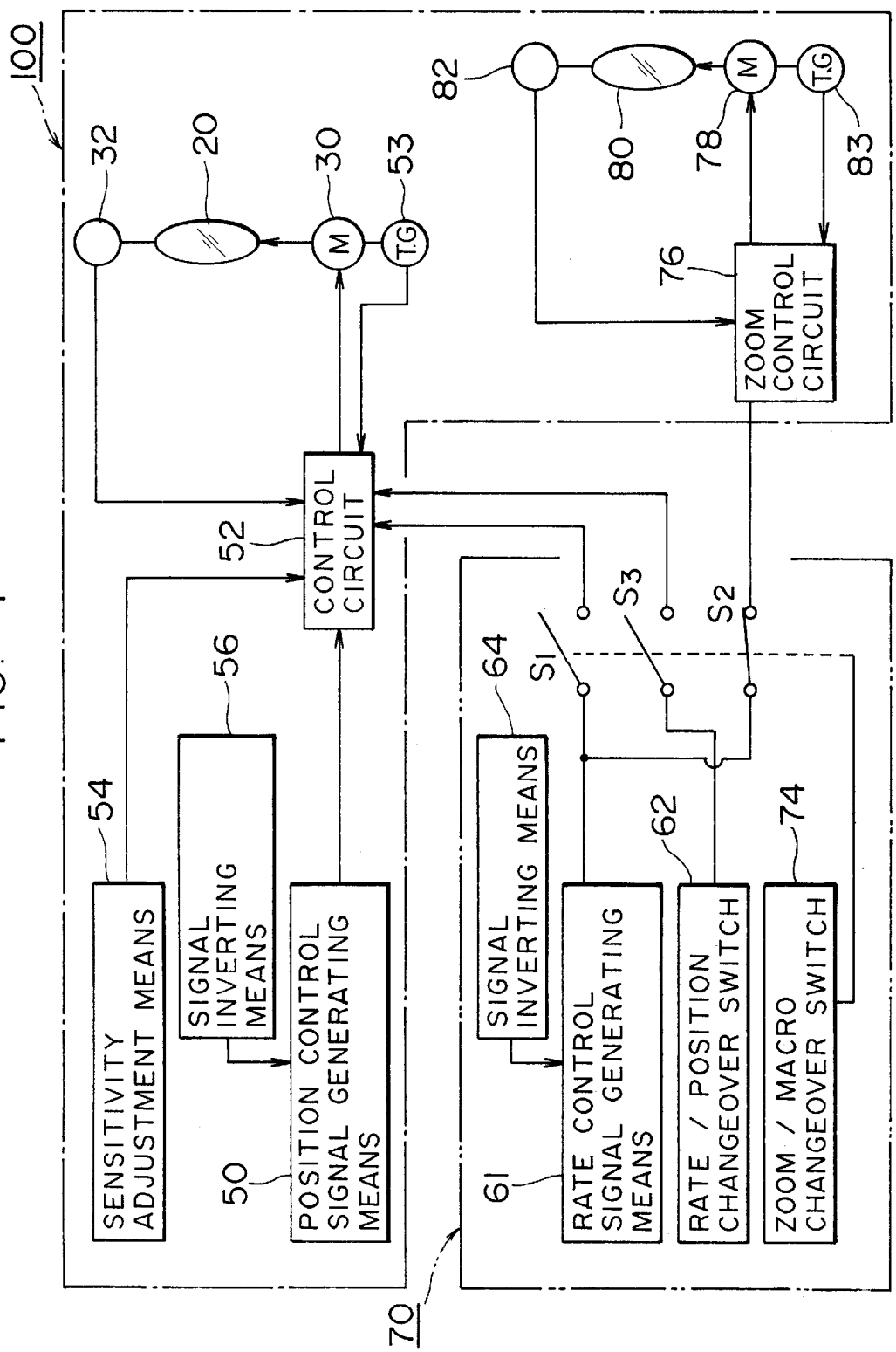
FIG. 4 is a block diagram illustrating another example of the drive control system for the master lens group.

FIG. 4 is a block diagram illustrating another embodiment of the present invention. Parts similar to those described with reference to FIG. 2 are denoted by the same reference numerals, and they will not be explained. A TV camera lens in FIG. 4 is constructed so that the zoom controller can serve as the macro-shooting controller for driving the master lens group 20.

A zoom/macro controller 70 is provided with the rate control signal generating means 61, the rate/position changeover switch 62, and a zoom/macro changeover switch 74, which interchanges the macro operation of driving the master lens group 20 with zoom operation of driving a zoom lens group 80. The route of a signal from the rate control signal generating means 61 is divided into two: one is connected to the control circuit 52 via a switch S1, the other is connected to a control circuit 76 of the zoom lens group drive system (zoom control circuit) via a switch S2. A signal from the rate/position changeover switch 62 is transmitted to the control circuit 52 of the master lens group drive system via a switch S3. The switches S1, S2, S3 are interlocking with the zoom/macro changeover switch 74.

When the zoom/macro changeover switch 74 is set to the "zoom" side, the switch S2 is closed and the switches S1, S3 are opened as shown in FIG. 4. At that time, the zoom/macro controller 70 functions as the zoom controller for controlling the zoom rate, and the rate control signal is transmitted to the zoom control circuit 76. The zoom control circuit 76 outputs a servo signal to a zoom motor 78 according to the input rate control signal. The zoom lens group 80 moves forward and backward along the optical axis by the rotational force of the zoom motor 78.

A potentiometer 82 determines the position of the zoom lens group 80, and transmits a signal representing the determined position to the zoom control circuit 76. A tachogenerator 83 which is connected to the motor 78 determines the number of rotations of the motor 78, and transmits a signal to the control circuit 52 so as to control the rate of the motor 78.

On the other hand, when the zoom/macro change over switch 74 is set to the "macro" side, the switches S1, S3 are closed and the switch S2 is opened. In this case, the zoom/macro controller 70 functions as the macro-shooting controller, which drives the master lens group 20. That is, the rate/position changeover switch 62 validates one of the rate control signal generating means 61 and the position control signal generating means 50. The master lens group 20 is driven according to the control signal from the one of the signal generating means which is validated by the rate/position changeover switch 62. This is the same with the embodiment described with reference to FIG. 2.

In order to adjust the flange back length of the TV camera lens which is constructed in the above-mentioned manner, the zoom/macro changeover switch 74 in FIG. 4 is set to the "zoom" side, and thereby the zoom/macro controller 70 functions as the zoom controller so as to validate the position control signal generating means 50. Or, the zoom/macro changeover switch 74 is set to the "macro" side, and the rate/position changeover switch 62 is set to the flange back length controller side so as to validate the position control signal generating means 50. Then, the master lens group 20 is set to the position of the proper flange back length by turning the flange back length control 42 while the image-formation condition is observed through the view finder 122 of the TV camera 120 in FIG. 3. When the flange back length adjustment is completed, the fixing knob 44 is turned to fix the rotational axis of the flange back length control 42.

In the normal shooting thereafter, the zoom/macro changeover switch 74 is set to the "zoom" side. In this case, the switches S1, S3 are opened and the switch S2 is closed as shown in FIG. 4, and thus the zoom/macro controller 70 functions as the normal zoom controller. That is, the variable magnification can be adjust by operating the zoom ring 126 by the left hand as shown in FIG. 3.

In the case of the macro-shooting, or in the case of the special shooting wherein an image is naturally obscured, the zoom/macro changeover switch 74 is set to the "macro" side, and the switch S2 is opened and the switches S1, S3 are closed. Thereby, the connection of the zoom/macro controller 70 and the zoom control circuit 76 is cut off, and the zoom/macro controller 70 is connected to the control circuit 52 of the master lens group 20. Then, the rate/position changeover switch 62 is set to the "rate" side so as to validate the rate control signal generating means 61. At that time, although the signal from the position control signal generating means 50 is disregarded, the position controlling status of the position control signal generating means 50 is maintained where the previously-adjusted position of the master lens group 20 of the proper flange back length is represented. The operating member (in this case, the zoom ring 126 is used) of the zoom/macro controller 70 is operated to rate-control and move the master lens group 20. Thus, the master lens group 20 can be moved to the macro-shooting position. Moreover, the master lens group 20, which is rate-controlled by the zoom/macro controller 70, can move smoothly along the optical axis, and the image can be naturally obscured. Both the operation for achieving such a special effect and the normal zooming operation can easily be performed by means of the zoom ring 126.

After the macro-shooting or the operation for achieving the special effects, setting the rate/position changeover switch 62 again to the flange back length controller side or setting the zoom/macro changeover switch 74 to the "zoom" side validates the position control signal generating means 50, and the master lens group 20 automatically returns to the previously-adjusted position of the proper flange back length.

As stated above, once the flange back length is adjusted, the position control signal generating means 50 maintains the position controlling status where the previously-adjusted position of the master lens group 20 is represented, even if the master lens group 20 is driven by means of the zoom/macro controller 70. Thus, the master lens group 20 can be automatically and repeatedly returned to the position of the proper flange back length without fail. Moreover, since the zoom controller is provided with the functions for the macro-shooting controller, which drives the master lens group 20, there is no need to provide the additional macro-shooting controller, and the master lens group 20 can be easily driven by means of the existing external operating member (i.e. the zoom ring).

In the embodiment described with reference to FIG. 4, there is provided the rate/position changeover switch 62, which operates to validate one of the position control signal generating means 50 and the rate control signal generating means 61; however, the rate/position changeover switch 62 may be omitted. For example, if the switch S3 is opened in association with the zoom/macro changeover switch 74, a low (L) signal indicating validation of the position control signal generating means 50 is transmitted to the control circuit 52; and if the switch S3 is closed in association with the zoom/macro changeover switch 74, a high (H) signal indicating validation of the rate control signal generating means 61 is transmitted to the control circuit 52. In this example, there is no need to provide the changeover switch 62. In this case, the zoom/macro changeover switch 74 is used as a substitute for the rate/position changeover switch 62.

In the embodiment described with reference to FIG. 4, the zoom/macro changeover switch 74 is integrated with the zoom/macro controller 70, and the signal from the rate control signal generating means 61 is divided into two in the zoom/macro controller 70. The zoom/macro changeover switch 74, however, may be constructed independently of the zoom/macro controller 70, and the signal from the rate control signal generating means 61 may be divided into two in the TV camera lens 100.

Figure 5:
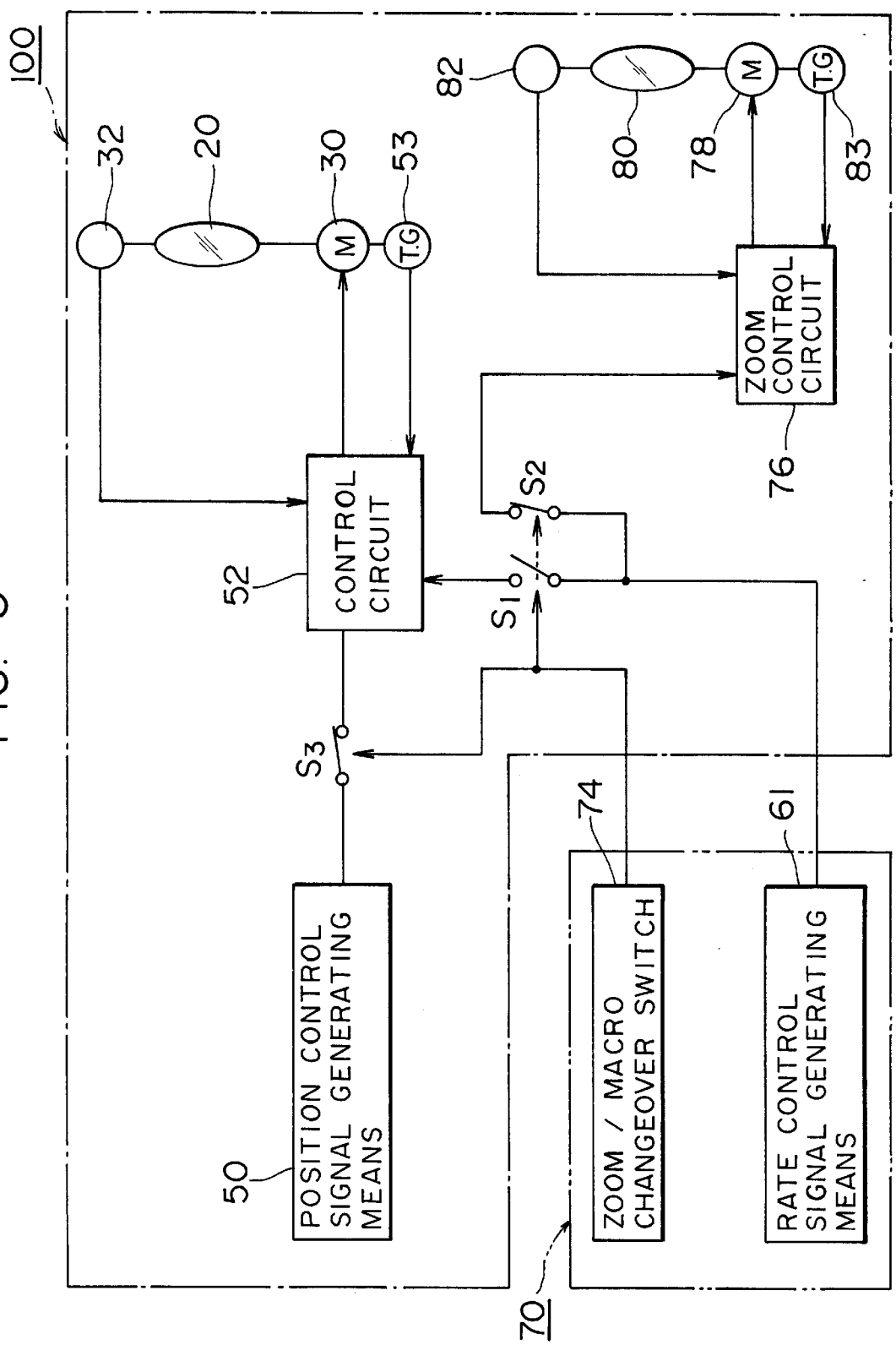
FIG. 5 is a block diagram illustrating another example of the drive control system for the master lens group.

FIG. 5 is a block diagram illustrating another embodiment of the present invention. Parts similar to those described with reference to FIG. 2 are denoted by the same reference numerals, and they will not be explained. The TV camera lens in FIG. 5 is constructed in such a way that the zoom controller serves as the macro-shooting controller for driving the master lens group 20. There is provided the zoom/macro changeover switch 74, which operates to determine whether the zoom/macro controller 70 should be used as the macro-shooting controller or as the zoom controller. The zoom/macro changeover switch 74 also operates to determine whether the position control signal generating means 50 should be validated or invalidated.

The zoom/macro controller 70 is provided with the rate control signal generating means 61 and the zoom/macro changeover switch 74. The route of the signal from the rate control signal generating means 61 is divided into two in the TV camera lens 100: one is connected to the control circuit 52 via the switch S1, the other is connected to the zoom control circuit 76 via the switch S2. The position control signal generating means 50 is connected to the control circuit 52 via the switch S3. The switches S1, S2, S3 are interlocking with the zoom/macro changeover switch 74.

When the zoom/macro changeover switch 74 is set to the "zoom" side, the switches S2, S3 are closed and the switch S1 is opened as shown in FIG. 5. At that time, the zoom/macro controller 70 functions as the zoom controller for controlling the zoom rate, and the rate control signal is transmitted to the zoom control circuit 76. A signal from the position control signal generating means 50 is transmitted to the control circuit 52. Thus, by turning the flange back length control 42 in FIG. 1, the master lens group 20 can be set at the position of the proper flange back length, and the zooming operation for the normal shooting can be performed.

On the other hand, when the zoom/macro changeover switch 74 is set to the "macro" side, the switch S1 is closed and the switches S2, S3 are opened. In this case, the zoom/macro controller 70 functions as the macro-shooting controller, and the position control signal generating means 50 is invalidated. Thus, by manipulating the zoom ring 126 in FIG. 3, the master lens group 20 can be moved to the macro-shooting position.

After the macro-shooting, when the zoom/macro changeover switch 74 is set to the "zoom" side, the master lens group 20 automatically returns to the previously-adjusted position of the proper flange back length.

Figure 6:
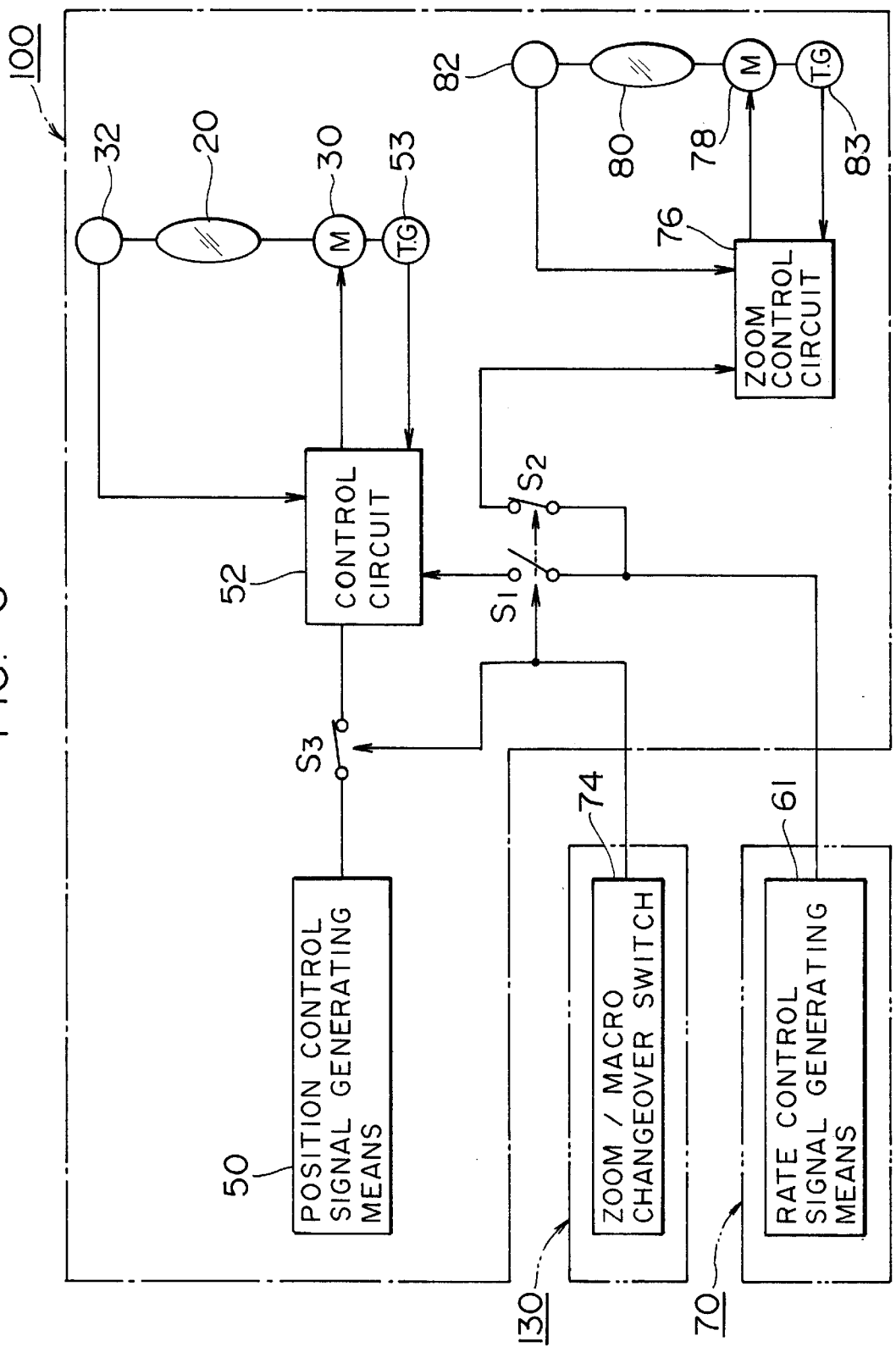
FIG. 6 is a block diagram illustrating another example of the drive control system for the master lens group.

In the embodiment described in FIG. 5, the zoom/macro controller 70 is provided with the operating member for interchanging the zoom operation with the macro-shooting operation. As shown in FIG. 6, however, a changeover controller 130, which includes the operating member for interchanging the zoom operation with the macro-shooting operation, may be provided independently of the zoom/macro controller 70. The operating method of the embodiment in FIG. 6 is the same as in the embodiment described with reference to FIG. 5, and hence it will not be explained here.

The above-mentioned construction of the embodiment in FIG. 6 has such an advantage that the conventional zoom controller can be used if the changeover controller 130 is additionally provided and the arrangement in the TV camera lens 100 is altered.

In the embodiments described above, the flange back length controller position-controls and moves the master lens group 20, and the macro-shooting controller rate-controls and moves the master lens group 20. The present invention, however, should not be restricted to this. The position control may be replaced by the rate control, and vice versa. The flange back length controller and the macro-shooting controller may perform either the rate control or the position control.

As set forth hereinabove, according to the TV camera lens of the present invention, there are provided the flange back length controller and the macro-shooting controller, which drive the master lens group. The switching means validates one of the two controllers. Once the flange back length controller adjusts the flange back length of the TV camera lens, the switching means validates the macro-shooting controller, so that the master lens group can be easily moved to the macro-shooting position.

The macro-shooting controller can smoothly move the master lens group along the optical axis, thereby achieving such a special effect that an image is naturally obscured.

Once the flange back length is adjusted, the flange back length controller maintains the position controlling status where the previously-adjusted position of the master lens group is represented. Thus, the master lens group can be correctly and repeatedly returned to the previously-adjusted position of the proper flange back length by validating the flange back length controller by means of the switching means, even after the master lens group is moved during the macro-shooting or the shooting aiming to achieve special effects.

Moreover, the zoom controller, which is the control means for the zoom lens, serves as the macro-shooting controller for driving the master lens group. Thus, there is no need to provide an additional controller, and the operation can be easily performed by means of the existing external operating member.

Furthermore, the operating amount of the first and second external operating members is converted into electric signals for driving the master lens group. Thus, if the sensitivity adjustment means changes the ratio of the moving amount of the master lens group to the operating amount of the first and second external operating members, one external operating member can rough adjust and fine adjust the position of the master lens group.

In addition, since there is provided the reverse means, which reverses the moving direction of the master lens group with respect to the operating direction of the first and second external operating members, the relationship between the operating direction of the operating member and the moving direction of the master lens group can be determined as the user's choice.

It should be understood, however, that there is no intention to limit the invention to the specific forms disclosed, but on the contrary, the invention is to cover all modifications, alternate constructions and equivalents falling within the spirit and scope of the invention as expressed in the appended claims.

What is claimed is:

1. A TV camera lens which moves a master lens group, arranged in a lens mount of a lens body, forward and backward along an optical axis in accordance with operation of either one of first and second external operating members, so as t adjust a flange back length and set an optical system for macro-shooting, said TV camber lens comprising:

a flange back length controller for outputting a first electric signal instructing said master lens group to move in accordance with an operating amount of said first external operating member for adjusting the flange back length;

a macro-shooting controller for outputting a second electric signal instructing said master lens group to move in accordance with an operating amount of said second external operating member for setting of the macro-shooting;

switching means for selectively validating one of said flange back length controller and said macro-shooting controller;

driving means for driving said master lens group; and control means for outputting a drive signal to said driving means to drive said master lens group in accordance with the one of said first and second electric signals output from the one of said flange back length controller and said macro-shooting controller which is selectively validated by said switching means, said master lens group being moved by said drive means to a position determined by said back flange controller whenever said flange back length controller is selectively validated by said switching means, and said master lens group being returned from a position to which it was adjusted by said macro-shooting controller to the flange back length position previously determined by the back flange controller when said flange length controller is re-validated after a selective validation of the macro-shooting controller.

2. The TV camera lens as defined in claim 1, wherein said macro-shooting controller rate-controls movement of said master lens group.

3. The TV camera lens as defined in claim 1, wherein at least one of said flange back length controller and said macro-shooting controller is provided with sensitivity adjusting means for adjusting a ratio of a moving amount of said master lens group to the operating amount of each of said first and second external operating members.

4. The TV camera lens as defined in claim 1, wherein at least one of said flange back length controller and said macro-shooting controller is provided with reverse means for reversing a moving direction of said master lens group with respect to a given operating direction of each of said first and second external operating members.

5. The TV camera lens as defined in claim 1, further comprising:

a zoom lens group arranged in said lens mount;

a zoom controller for rate-controlling movement of said zoom lens group, said zoom controller serving as said macro-shooting controller; and second switching means for validating one of an instruction for rate-controlling the movement of said zoom lens group and an instruction for rate-controlling movement of said master lens group, said second switching means invalidating the instruction having not been validated.

6. The TV camera lens as defined in claim 5, wherein said macro-shooting controller is constructed independently of said lens body and is provided with said second switching means, said macro-shooting controller and said lens body being connected to one another via a cable.

7. The TV camera lens as defined in claim 5, wherein:

said macro-shooting controller is constructed independently of said lens body, said macro-shooting controller and said lens body being connected to one another via a cable;

said second switching means comprises a zoom/macro switching operation member for determining whether an electric signal output from said zoom controller should be used as the instruction for rate-controlling the movement of said zoom lens group or as the instruction for rate-controlling the movement of said master lens group, and a zoom/macro switching means for transmitting an electric signal output from said zoom controller to one of driving means for said zoom lens group and said driving means for said master lens group in accordance with operation of said zoom/macro switching operation member; and said lens body is provided with said zoom/macro switching means.

8. The TV camera lens as defined in claim 5, wherein:

said second switching means comprises a zoom/macro switching operation member for determining whether an electric signal output from said zoom controller should be used as the instruction for rate-controlling the movement of said zoom lens group or as the instruction for rate-controlling the movement of said master lens group, and is provided with functions of said switching means which validates one of said flange back length controller and said macro-shooting controller;

if said zoom/macro switching operation member is turned to a zoom side, said flange back length controller is validated; and if said zoom/macro switching operation member is turned to a macro side, said macro-shooting controller is validated.

* * * * *